United States Patent
Parnell et al.

(10) Patent No.: US 11,109,583 B2
(45) Date of Patent: Sep. 7, 2021

(54) INSECT TRAPPING LIGHT

(71) Applicant: KP Solutions, Inc., Lucedale, MS (US)

(72) Inventors: Keith Adonnis Parnell, Lucedale, MS (US); Jessie Leigh Parnell, Lucedale, MS (US)

(73) Assignee: KP Solutions, Inc., Lucedale, MS (US)

( * ) Notice: Subject to any disclaimer, the term of this patent is extended or adjusted under 35 U.S.C. 154(b) by 168 days.

(21) Appl. No.: 16/276,247

(22) Filed: Feb. 14, 2019

(65) Prior Publication Data
US 2020/0260713 A1 Aug. 20, 2020

(51) Int. Cl.
| | | |
|---|---|---|
| A01M 1/14 | (2006.01) | |
| F21V 3/00 | (2015.01) | |
| F21Y 113/13 | (2016.01) | |
| F21Y 115/10 | (2016.01) | |

(52) U.S. Cl.
CPC ............. *A01M 1/145* (2013.01); *F21V 3/00* (2013.01); *F21Y 2113/13* (2016.08); *F21Y 2115/10* (2016.08)

(58) Field of Classification Search
CPC .......... A01M 1/04; A01M 1/14; A01M 1/145; A01M 1/00; A01M 1/02; A01M 1/2016
USPC ................................... 43/113, 114
See application file for complete search history.

(56) References Cited

U.S. PATENT DOCUMENTS

| | | | | |
|---|---|---|---|---|
| 4,876,822 A | * | 10/1989 | White .................. | A01M 1/145 43/113 |
| 5,251,397 A | * | 10/1993 | Exum .................. | A01M 1/145 43/113 |
| 5,588,250 A | | 12/1996 | Chiba et al. | |
| 5,918,932 A | * | 7/1999 | Morrison ............ | F21V 33/0012 297/217.6 |
| 5,950,355 A | | 9/1999 | Gilbert | |
| 5,974,727 A | | 11/1999 | Gilbert | |
| 6,108,965 A | | 8/2000 | Burrows et al. | |
| 6,397,515 B1 | | 6/2002 | Brown et al. | |

(Continued)

FOREIGN PATENT DOCUMENTS

| | | | |
|---|---|---|---|
| KR | 20110020513 A | * | 3/2011 |
| KR | 10-1105832 | | 1/2012 |

(Continued)

OTHER PUBLICATIONS

International search report dated Jul. 25, 2019 for PCT/US2019/033330.

(Continued)

*Primary Examiner* — Darren W Ark
*Assistant Examiner* — Katelyn T Truong
(74) *Attorney, Agent, or Firm* — Baker Donelson

(57) ABSTRACT

There is disclosed an insect trapping light which includes a visible light housing defining a visible light chamber and an insect trapping housing defining a separate UV light chamber. The visible light housing includes a floor having a matrix white light LEDs on one side while the insect trapping housing includes a plurality of UV LEDs mounted on the floor other side. The visible light housing also includes a rectangular frame, a translucent light diffuser plate and a translucent logo plate. The diffuser plate is mounted to the frame such that there are no gaps that enable an insect to enter the visible light housing. The insect trapping housing includes a mounting plate and an adhesive board with removable adhesive strips.

7 Claims, 3 Drawing Sheets

(56) References Cited

U.S. PATENT DOCUMENTS

| | | | |
|---|---|---|---|
| 6,493,986 B1 | 12/2002 | Nelson et al. | |
| 6,959,510 B1 * | 11/2005 | Nelson | A01M 1/04 43/113 |
| 8,572,890 B1 * | 11/2013 | Lark | A01M 1/04 43/113 |
| 8,959,831 B2 | 2/2015 | Smith | |
| 10,051,851 B2 * | 8/2018 | Hariyama | A01M 1/145 |
| 2002/0074559 A1 | 6/2002 | Dowling et al. | |
| 2002/0083639 A1 | 7/2002 | Perry | |
| 2006/0107583 A1 | 5/2006 | Wu | |
| 2006/0150472 A1 * | 7/2006 | Harris | A01M 1/14 43/113 |
| 2007/0124987 A1 | 6/2007 | Brown et al. | |
| 2008/0229652 A1 | 9/2008 | Willcox et al. | |
| 2009/0277073 A1 | 11/2009 | Chen | |
| 2010/0024278 A1 | 2/2010 | Simchoni-Barak et al. | |
| 2012/0304513 A1 * | 12/2012 | Gorelick | G09F 23/06 40/581 |
| 2012/0324779 A1 | 12/2012 | Kovacs et al. | |
| 2017/0290322 A1 | 10/2017 | Soeno | |
| 2019/0350184 A1 * | 11/2019 | Chang | G01V 8/12 |

FOREIGN PATENT DOCUMENTS

| | | | |
|---|---|---|---|
| WO | 2015/164849 | 10/2015 | |
| WO | WO-2017175927 A1 * | 10/2017 | A01M 1/08 |

OTHER PUBLICATIONS

Written Opinion of ISA dated Jul. 25, 2019 for PCT/US2019/033330.

* cited by examiner

INSECT TRAPPING LIGHT

TECHNICAL FIELD

This invention relates generally to a trap for flying insects, and more particularly to a trap for flying insects which provides signage capabilities.

BACKGROUND OF INVENTION

Many flying insect traps have been devised to eliminate insects from a location. Many of these types of traps include an electrified grid surrounding an insect attracting light. The insect attracting light is typically an ultraviolet light. In use, as the insect is drawn to and approaches the UV light, it encounters the electrified grid wherein the insect is killed by the electric current. A problem with this type of insect trap is that it is not allowed in the food service industry as the electrification of the insect essentially causes it to explode and disperse the insect particles into the surrounding air.

As such, insect traps utilized in the food service industry typically utilize an adhesive board mounted adjacent to a UV light. The insect approaching the UV light encounters the adhesive board wherein the insect is adhered to the board and is unable to extricate itself. The adhesive board is removable so that the board and its contents may be exchanged with a new board from time to time. A problem associated with these types of insects traps is that they are unsightly in appearance. Furthermore, the patrons within the food establishment readily recognize the device as an insect light because of the glow emanating from the UV light. These patrons may be repulsed by the perception that this food establishment may have an insect problem. Furthermore, the patron will purposely sit in a location far away from the insect trap thinking that the trap will draw insects to that location.

Accordingly, it is seen that a need remains for an insect trap which provides a safe and effective manner of trapping insects while providing a pleasing appearance which does not convey to the public the presence of an insect light. It is to the provision of such therefore that the present invention is primarily directed.

SUMMARY OF THE INVENTION

In a preferred form of the invention an insect trap light comprises a visible light housing portion having a floor, sidewalls extending from the floor, and a translucent light diffuser plate, the combination of the floor, sidewalls and light diffuser plate creating an enclosed visible light chamber. A visible light source mounted within the visible light chamber. The insect trap light also has an insect trapping housing portion having a mounting plate coupled to the visible light housing portion creating a UV light chamber. A UV light source is mounted within the UV light chamber. An adhesive board is removably mounted within the UV light chamber.

DETAILED DESCRIPTION

Figure 1:
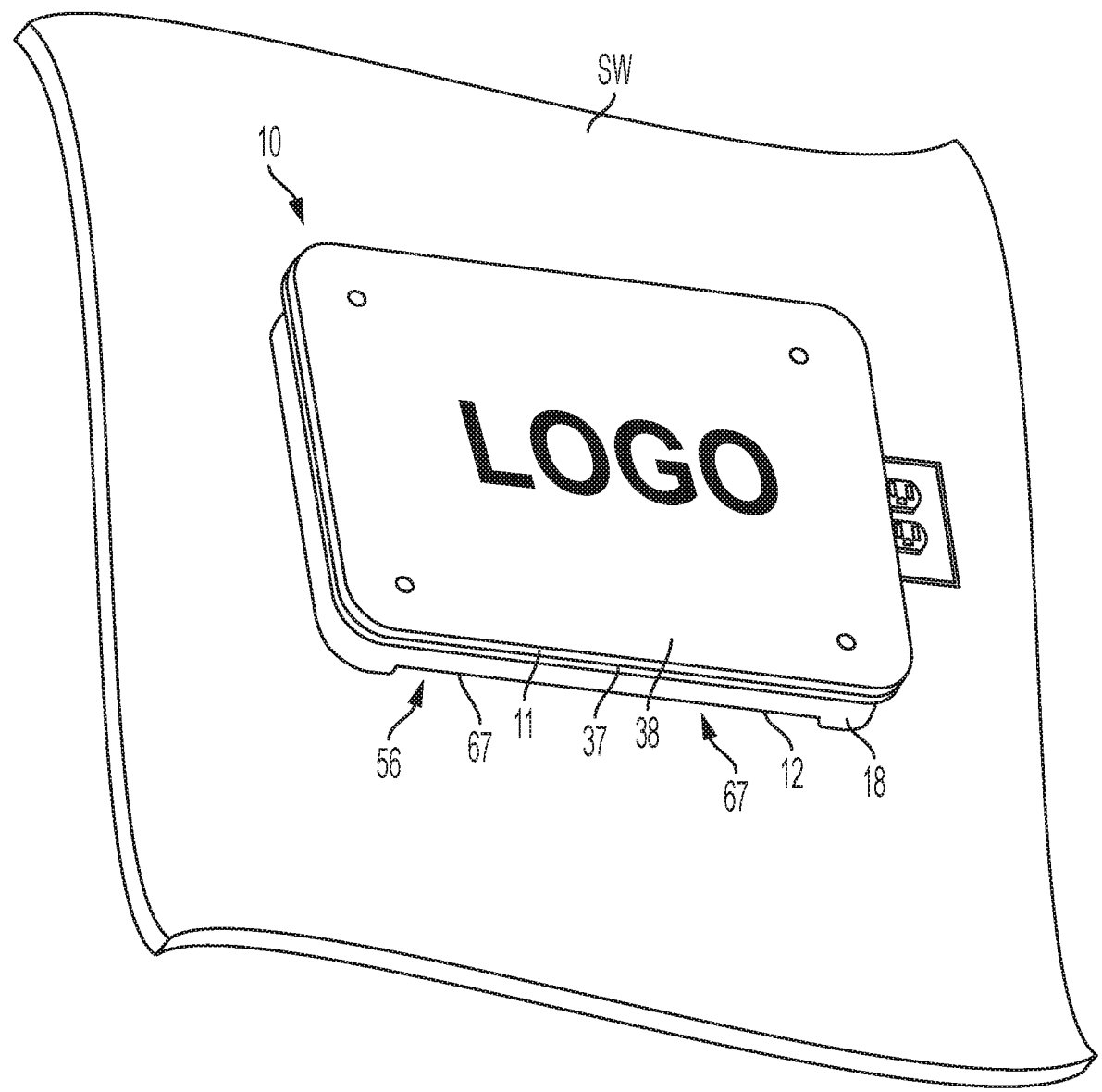
FIG. 1 is a perspective view of the insect trapping light embodying principles of the invention in a preferred form.
Figure 2:
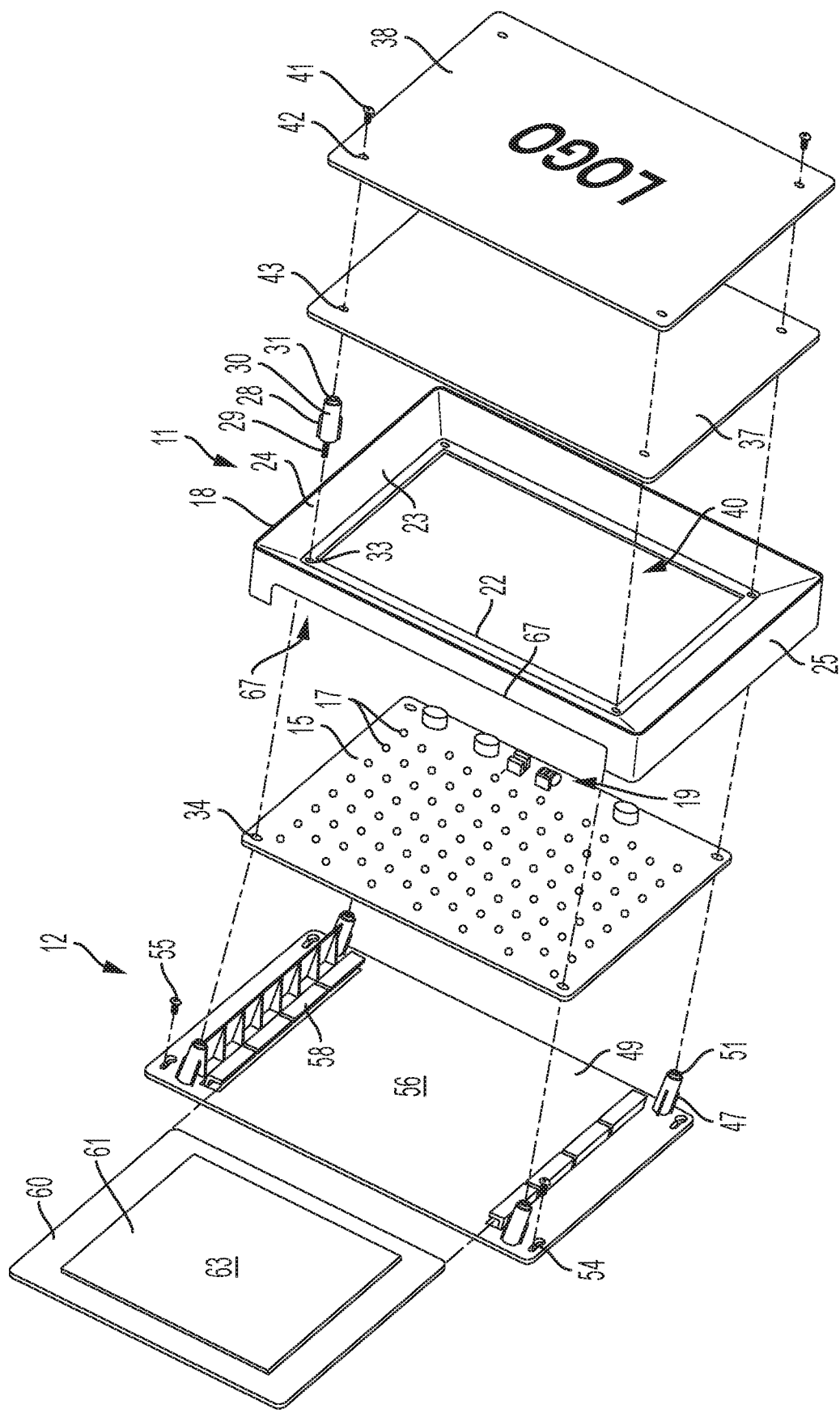
FIG. 2 is a perspective, exploded view of the insect trapping light of FIG. 1.
Figure 3:
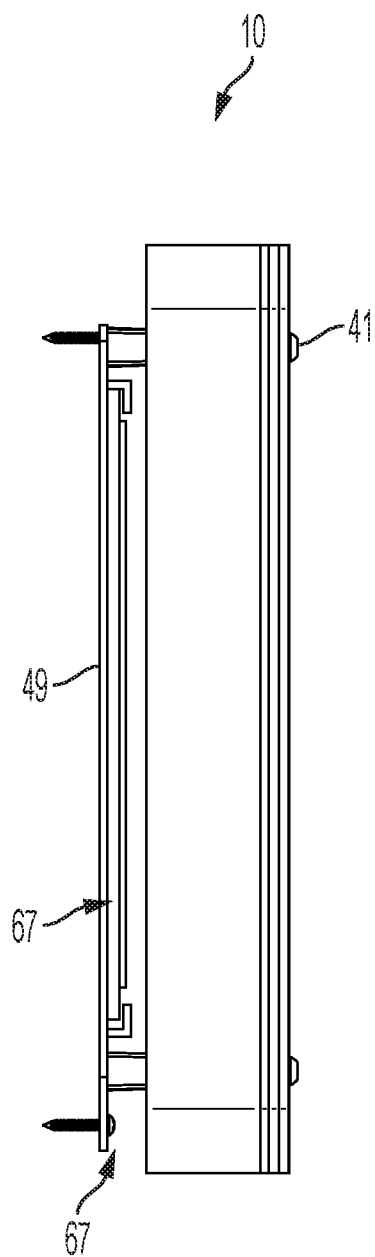
FIG. 3 is a side view of the insect trapping light of FIG. 1.
Figure 4:
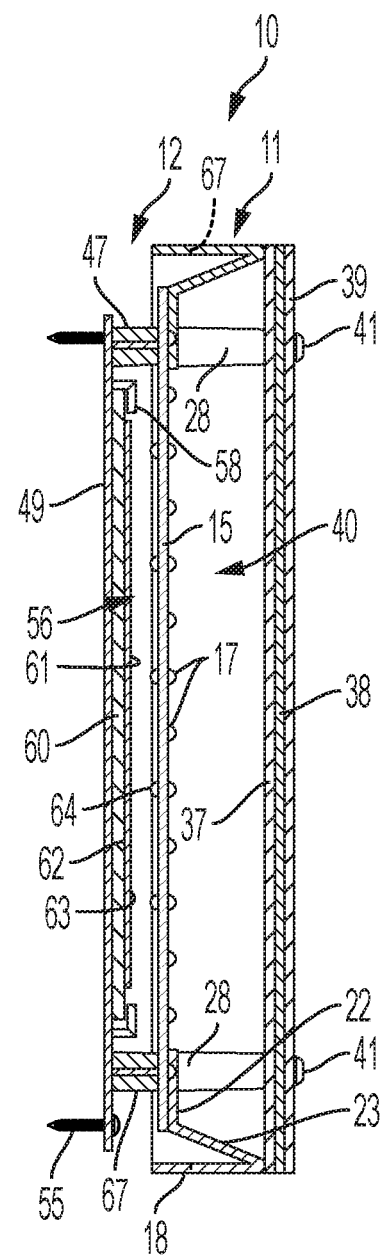
FIG. 4 is a cross-sectional side view of the insect trapping light of FIG. 1.

With reference next to the drawings, there is shown an insect trapping light 10 according to the present invention. The insect trapping light 10 is typically mounted to a vertical supporting wall of a room. The insect trapping light 10 includes a visible light housing portion, enclosure, or housing 11 and an insect trapping housing portion, enclosure or housing 12 coupled to the visible light housing 11.

As shown in the drawings, the insect trapping light 10 is generally rectangular or box shaped, however, it should be understood that the insect trapping light 10, the visible light housing 11, and/or the insect trapping housing 12 may be of any shape or configuration.

The visible light housing 11 includes a floor 15 having a matrix or array of white light or visible light lights or light sources 17, preferably in the form of white light emitting diodes (LEDs), and a rectangular, peripheral frame 18. The term-white light is used herein, but is meant to include any visible light, including actual white light or any static or adjustable colored lights. The LEDs 17 are coupled to LED conventional circuitry 19 mounted to the floor 15, which in turn is coupled to an electric power source. The LED circuitry 19 may include an on/off switch for the visible light LEDs 17.

The rectangular frame 18 includes a base member 22 mounted flushly against the floor 15 and a side wall member 23 extending from the base member 22 having an interior surface 24 and an exterior surface 25. The rectangular frame 18 is coupled to the floor 15 through four threaded posts 28, each threaded post 28 having a bottom end 29 with external threads and a top end 30 having an internally threaded screw mounting hole 31. The threaded bottom end 29 extends through a screw mounting hole 33 in the frame base member 22 and into a spacer hole 34 in the floor 15 aligned with screw mounting holes 53.

A translucent light diffuser portion or plate 37 is positioned against the top edge of the side wall member 23 of the frame 18. The diffuser plate 37 may be made of a polymer or other material, such as an acrylic or high density polyethylene. A transparent or translucent decorative, advertisement, or logo plate 38 is positioned to overlay and generally conform to the peripheral configuration of the light diffuser plate 37. The logo plate 38 may be made of a polymer or other material, such as an acrylic or high density polyethylene. The term translucent used herein is intend to denote both transparent and translucent or diffusing light qualities. The logo plate 38 may be colored itself with a graphic or may include an indicia or graphic overlay or layer 39 adhered to either side of the logo plate 39, the graphic being shown in the drawings as the word "LOGO". The graphic overlay 39 may be made of a polymer material, such as a vinyl material or the like. The diffuser plate 37 is mounted to the rectangular frame 18 such that there are no gaps or spaces which could enable an insect to enter the visible light housing 11.

Four mounting screws 41 extend through four screw mounting holes 42 in the logo plate 38 and four mutually aligned screw mounting holes 43 in the diffuser plate 37 and are threadably received into the screw mounting holes 31 of the threaded posts 28. The combination of the floor 15, frame 18, and light diffuser plate 37 form an enclosed visible light chamber 40, wherein the term enclosed means that the visible light chamber does not have openings which would allow insects access to the visible light chamber 40.

Four spacers 47 extend between the floor 15 and a mounting plate 49, with each spacer 47 having a top end 51 positioned within the floor spacer hole 34 so as to threadably receive the threaded bottom ends 29 of the posts 28 in order to couple the frame 18 to the floor 15. The spacers 47 provide for a UV light space or chamber 56 between and defined by the floor 15 and the mounting plate 49. The mounting plate 49, spacer 47 and floor 15 combine to define the insect trapping housing portion 12.

The mounting plate 49 also has four keyhole shaped mounting hole 54 extending therethrough which are configured to receive mounting screws 55 that extend into a supporting wall SW of a room.

The mounting plate 49 also has a pair of generally parallel, inverted L-shaped guides 58. An adhesive board 60 is slidably received and held in place between the L-shaped guides 58. The adhesive board 60 is coupled to one or more removable adhesive strips 61 which have a first adhesive surface 62 facing the adhesive board for mounting thereto and a second adhesive surface 63 adapted to capture insects coming in contact with the second adhesive surface 63.

The insect trapping housing portion 12 also includes a matrix or array of UV lights or light sources 64, preferably in the form of UV LEDs. The UV LEDs 64 are mounted to the underside of the floor 15 oppositely disposed from the visible light LEDs 17. The UV LEDs are electrically coupled to the circuitry 19 and may include a separate on/off switch for controlling the activation of the UV LEDs 64. The UV LEDs 64 face the adhesive board 60 to (UV) illuminate the insect collection or UV light space or chamber 56. The spacing between the mounting board 60 and the visible light housing portion 11 defines the insect trapping portion 12, and specifically the UV light chamber 56, as having open sides 67 which allow the entrance of insects from the peripheral or side areas of the insect trap light 10 rather than the forward facing area of the insect trap light 10 when oriented or mounted upon a vertical wall. Preferably, the bottom side is closed to prevent insects from falling out of the insect trapping portion 12.

In use, the insect trap light 10 is mounted to a vertical support or supporting wall SW of an enclosure such as a room, restaurant, kitchen, etc. The insect trap light 10 is mounted by passing mounting screws 55 through the keyhole shaped mounting holes 54 within the mounting plate 49 and into the room's vertical supporting wall holding the insect trap light 10. For convenience, the mounting screws 55 may not be tightened all the way so that the insect trap light 10 may be easily removed by sliding it upwardly so that the heads of the mounting screws are positioned within the larger portion of the keyhole shaped mounting holes to allow the passage of the mounting screw heads through the mounting holes 54.

The insect trap light 10 has the logo plate 38 which is colored or provided with an decorative overlay 39 which may be associated with the name of the restaurant, food or beverage product, or other decorative indicia. The illumination of the white LEDs 17 creates visible or white light which passes through the light diffuser plate 37 and through the logo plate 38, and/or the overlay 39, so that the light illuminates the graphics associated with the logo plate 38. As such, the insect trap light 10 provides an advertising or decorative visible light source. The illumination of the white light may be controlled through the on/off switch associated with the while LEDs 17.

The illumination of the UV LEDs 64 provides UV light within the insect collection or UV light chamber 56. This UV light is visible through the open sides 67 of the insect trapping housing portion 12. However, this UV light is not directly visible to a person facing the front of the insect trap light 10 as there are no openings from the insect trapping housing portion 12 which face in the front direction. The term forward or front direction described herein is meant to describe a direction extending horizontally from the insect trap light 10 and generally parallel to the floor of a room and/or perpendicular to the vertical support wall of the room. As such, a person within the room which contains the insect trap light 10 does not usually see the UV LEDs 64 or the light produced by such UV LEDs. The UV light produced by UV LEDs is invisible to the human eye, however, these UV LEDs also produce a visible, purple or blue colored light which people commonly associate with UV lights, and it is this visible purple light from the UV LEDs which the person does not readily see or recognize because of the orientation of the openings to the UV light chamber 56 being only upon the open sides 67 and not the front facing surfaces of the insect trap light 10.

With the illumination of the UV LEDs 64, insects within the room may be attracted to the location of the UV LEDs 64 within the insect trapping housing portion 12. Once drawn into the insect trapping housing portion 12, the insect may readily contact the second adhesive surface 63 of the adhesive strips 61, thereby becoming stuck to the adhesive strip 61. Once the adhesive strip 61 has captured a sufficient number of insects or after a set time frame, the adhesive strip 61 may be replaced with a fresh adhesive strip 61. This task is accomplished by simply sliding the adhesive board 60 out of the insect trapping housing portion 12 through sliding cooperation with the L-shaped guides 58. The adhesive strips 61 may then be peeled off the adhesive board 60 and replaced.

It should be understood that the UV light produced by the UV LEDs 64 is separate and apart from the visible light produced by the visible or white light LEDs 17. As such, the white light from visible LEDs 17 may be utilized for decorative or advertising purposes while the UV light from UV LEDs 64 is used for insect trapping purposes. Each may also operate separately or apart from each other through their respective on/off switches associated with the LED circuitry 19.

The illuminated portion provides an advertising media or opportunity through the logo associated with the logo plate 38. Hence, a bar may include a selected brand of beer as the indicia of the logo plate, which may be subsidized by the beer manufacturer as well as a promotional item.

It should also be understood that the visible light housing portion 11 and its visible light chamber 40 is separate from the UV light chamber 56 so that insects drawn to the UV light cannot migrate into the visible light chamber 40.

It should also be understood that the UV light from the UV LEDs is greatly hidden from direct view as it is not visible from the front side of the insect trap light 10. By hiding the UV light (purple colored light glow) from view, patrons of food establishments are not reminded and disgusted by the thought of insects during their dining experience.

It should be understood that the light diffuser plate 37 and logo plate 38 are shown generally even with the side wall member 23 of the frame 18. However, these plates 37 and 38 may be configured to extend past the side wall members 23 to block the view of the open sides 67 of the insect trapping housing portion 12 to a larger extent.

It should be understood that the logo plate may be easily removably and replaceable to enable the logo thereon to be changed.

Lastly, it should be understood that the light diffuser plate 37 and the logo plate 37 may be combined into one plate. It is preferred to have these as two separate plates as this provides for a manner of easily changing the logo or design associated with the logo plate 37. The combined plates may be referenced herein as either a diffuser plate or a logo plate as it has the characteristics of both.

It thus is seen that an insect trap light is now provided which overcomes problems associated with the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. An insect trap light comprising:
    a visible light housing portion having a floor, sidewalls extending from said floor, and a translucent light diffuser plate, the combination of the floor, sidewalls and light diffuser plate creating an enclosed visible light chamber;
    a visible light source mounted within said visible light chamber;
    an insect trapping housing portion having a mounting plate coupled to said visible light housing portion creating an ultraviolet light chamber, said insect trapping housing portion being outside said enclosed visible light chamber;
    wherein said light diffuser plate is considered a front surface, said mounting plate is considered a rear surface, and said ultraviolet light chamber includes side openings extending between said front surface and said rear surface;
    an ultraviolet light source mounted within said ultraviolet light chamber, and
    an adhesive board removably mounted within said ultraviolet light chamber.

2. The insect trap light of claim 1 wherein said side openings of said ultraviolet light chamber extend between said mounting plate and said visible light housing portion.

3. The insect trap light of claim 1 further comprising a logo plate overlying said light diffuser plate.

4. The insect trap light of claim 3 wherein said logo plate includes a layer of decorative graphic.

5. The insect trap light of claim 4 wherein said layer of decorative graphic is a layer of polymer material.

6. The insect trap light of claim 1 wherein said visible light source is a plurality of white light emitting diodes.

7. The insect trap light of claim 6 wherein said ultraviolet light source is a plurality of ultraviolet light emitting diodes.

* * * * *